United States Patent [19]

Savage et al.

[11] Patent Number: 4,836,148
[45] Date of Patent: Jun. 6, 1989

[54] SHROUDING FOR ENGINE COOLING FANS

[75] Inventors: John R. Savage, Kettering; Robert C. Mellin, Centerville, both of Ohio

[73] Assignee: General Motors Corporation, Detroit, Mich.

[21] Appl. No.: 205,718

[22] Filed: Jun. 13, 1988

[51] Int. Cl.⁴ .............................................. F01P 7/10
[52] U.S. Cl. .............................. 123/41.49; 415/170.1; 415/173.1
[58] Field of Search ............... 123/41.49, 41.63, 41.65, 123/41.7; 415/172 A

[56] References Cited

U.S. PATENT DOCUMENTS

| | | | |
|---|---|---|---|
| 3,280,902 | 10/1966 | Laing | 165/122 |
| 3,842,902 | 10/1974 | Poslusny | 415/172 A X |
| 4,329,946 | 5/1982 | Longhouse | 123/41.49 |
| 4,357,914 | 11/1982 | Hauser | 123/41.49 |
| 4,505,641 | 3/1985 | Tsuchikawa et al. | 415/172 A X |
| 4,685,513 | 8/1987 | Longhouse et al. | 123/41.49 X |

FOREIGN PATENT DOCUMENTS 2034435 10/1978 United Kingdom ......... 415/DIG. 1

Primary Examiner—Tony M. Argenbright
Assistant Examiner—Eric R. Carlberg
Attorney, Agent, or Firm—A. Michael Tucker

[57] ABSTRACT

Shrouded engine cooling fan in which the interface between an outer stationary shroud fixed with respect to a radiator and an inner and rotating shroud fixed to the tips of the fan blades define a generally toroidal chamber in which a vortex of air is generated in response to the rotational drive of said fan that acts as a seal to block the flow of recirculation air from the fan discharge to the fan entrance over a wide range of fan operating points to increase fan operating efficiency and reduce fan generated noises.

5 Claims, 1 Drawing Sheet

SHROUDING FOR ENGINE COOLING FANS

FIELD OF THE INVENTION

This invention relates to shrouded engine cooling fans and, more particularly to a multi-bladed cooling fan having new and improved relatively rotatable shrouding which is operative to retard the recirculation of fan discharge air into the fan inlet over a wide range of fan operating points to thereby improve fan efficiency and to reduce fan generated noises.

DESCRIPTION OF RELATED ART

Various fan designs for engine cooling utilize special fixed and rotatable shrouding which is intended to make the fan pump air with high efficiency and without generating excessive noise. Among these are shroud arrangements that have stationary shrouding that is fixed with respect to an engine heat dissipating radiator and rotatable shrouding fixed to the tips of the fan blading that operates within the fixed shrouding. In U.S. Pat. No. 4,329,946, assigned to the assignee of this invention and hereby incorporated by reference a fan with a rotatable shroud is immersed within a fixed shroud in a design that provides effective blockage of a recirculation air path occurring between the two shrouds. This blockage however is optimally effective in a narrow range of fan operating points and occurs at the discharge side of the rotatable fan with fan discharged air blocking an annular clearance path between the rotating and fixed shrouds. The operating point of a fan is defined as the ratio of the air flow rate to the pressure rise. While this prior construction provides efficient and quiet pumping it is highly sensitive to fan operating point and effectiveness at points outside of a very narrow range of fan operating points is materially reduced since blockage falls and considerable volumes of air can recirculate to the fan inlet so that fan noise abatement and pumping efficiency is reduced.

SUMMARY OF THE INVENTION

In the present inention a bellmouthed rotating ring shroud is fixed to the tips of the blades of an engine cooling fan and is immersed in a cooperating stationary shroud. These shrouds have an interface configuration that uses the pressure differential and entrained air flow in a generally toroidal chamber in an annular clearance passage between the shrouds to generate a vortex of air. This vortex acts as a seal to block a majority of air that would otherwise recirculate from the high pressure to the low pressure side of the fan. With this new and improved recirculation blockage the fan does not have to repump air so that fan efficiency and noise abatement are optimized. This invention is effective for substantially all fan operating points and particularly effective when the fan is immersed within a cylindrical ejector so that an additional air seal is formed at the discharge end of the fixed and rotatable shrouding. With this dual seal arrangement recirculating flow at the operating point of the fan where the rear seal is effective is optimally blocked because the vortex front seal blocks recirculation bypassing the rear seal. At the other fan operation points where the effectiveness of the rear seal is reduced or marginal, the vortex seal continues to provide a highly effective seal. In the preferred embodiment of the invention, the vortex of air generated in the vortex chamber acts as a localized area of high pressure that blocks the pathway of recirculating air flow adjacent the periphery of a bellmouth inlet of the rotating shroud to provide a full time front seal. This full time front seal also blocks forward entrance of the vortex seal chamber so that large quantities of air flowing into the fixed shrouding through the radiator are routed into the entrance of the rotating ring shroud.

DESCRIPTION OF THE PREFERRED EMBODIMENTS

Figure 1:
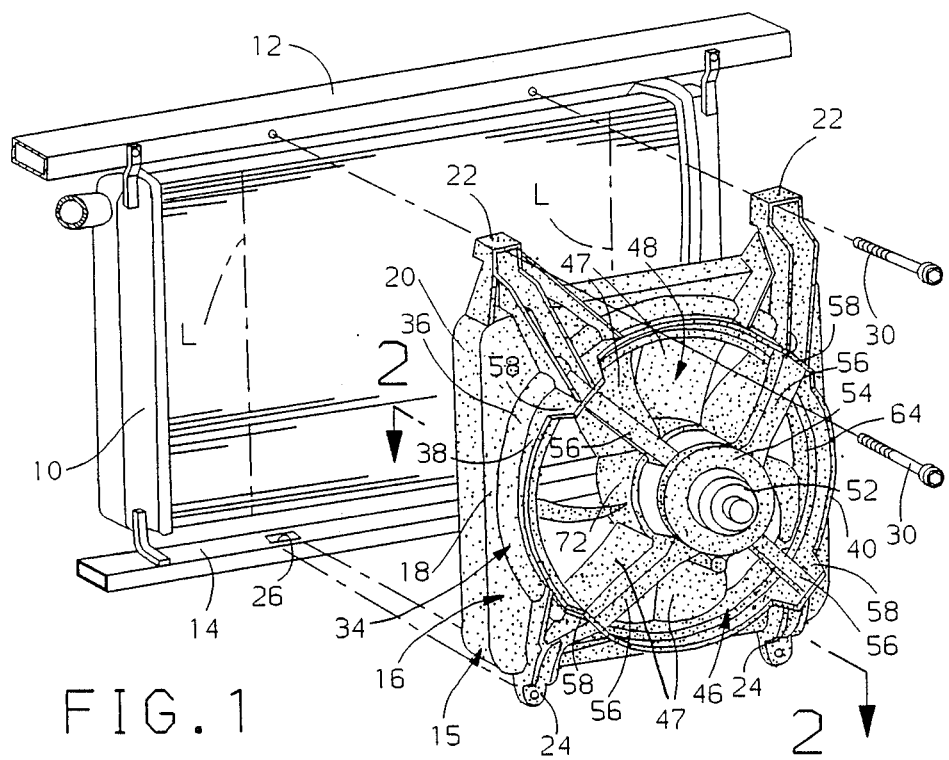
FIG. 1 is an exploded pictorial view of a vehicle engine cooling fan and an associated radiator through which engine coolant is circulated.
Figure 2:
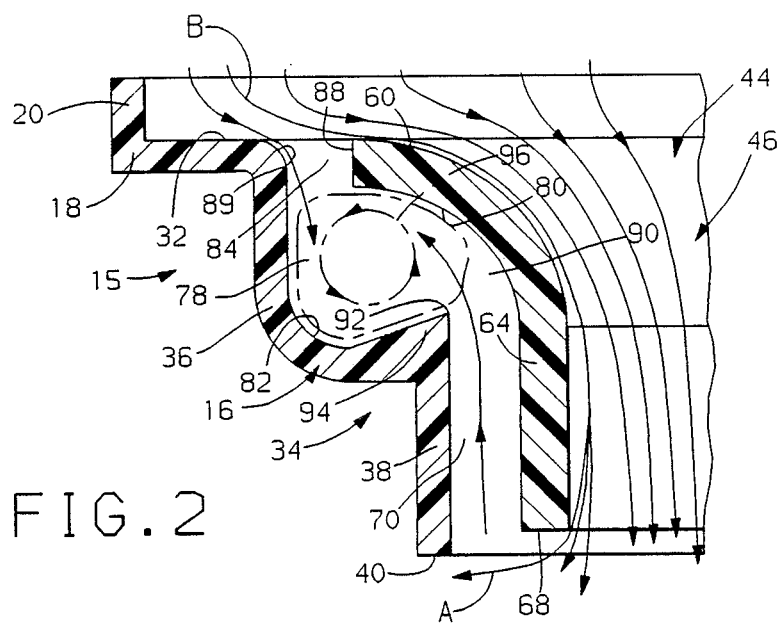
FIG. 2 is a cross sectional view taken along lines 2—2 of FIG. 1 llustrating one preferred embodiment of the invention.

Turning now in greater detail to the drawings there is shown in FIG. 1 a conventional radiator 10 adapted to be operatively mounted in an engine compartment of a vehicle for cooling the fluid coolant circulated therethrough. The radiator is mounted to upper and lower supports 12 and 14 which also serve as the supporting structure for a shrouded engine cooling fan assembly 15 to which this invention is drawn. This assembly includes a shell-like outer shroud 16 molded from a suitable plastics material having a rectilinear face plate 18 bounded by a peripheral and forwardly extending wall 20 providing good radiator coverage such as between lines L—L in FIG. 1. Mounting ears 22 and 24 respectively extending upward and downward from wall 20 provide means to secure the outer shroud and thus the fan assembly to the supports 12 and 14 with ears 24 being inserted in laterally spaced slots 26, one of which is not shown, in the lower support 14 while the upper ears 22 receive fasteners 30 that thread into the upper support 12. The face plate 18 has a planar interior surface 32 which faces the radiator and extends inwardly from the peripheral wall 20 to a doubled stepped and rearwardly extending cylindrical ejector 34. FIG. 2 illustrates a cross section of part of ejector 34 which has a large diameter step 36 integral with and extending rearwardly from the face plate and a reduced diameter step 38 continuing from the large diameter step to a terminal annular end 40. The cylindrical reduced diameter step forms the discharge end of the fixed fan shroud.

The large diameter step 36 of the cylindrical ejector 34 accommodates the outwardly flaring bellmouth 44 providing the inlet of a rotatable shroud 46 that is secured to the tips of the blades 47 of a multiple bladed cooling fan 48. The fan 48 is supported for rotation within shoud 16 by the output shaft of an electric motor 52. This motor is in turn centrally supported within the stationary shroud 16 by a support collar 54 and three or more spokes 56 radiating therefrom to attachment with three or more arcuately spaced ears 58 projecting axially from the reduced diameter step 38 of the outer shroud 16. As best shown in FIG. 2 the bellmouth of the rotatable shroud has an annular forward surface 60 at the entrance thereof that is smooth and substantially coplanar with the forward surface 32 of the outer shroud 16 to enhance the flow of air from the fixed outer shroud into the rotatable shroud. With this configuration, and with the forward air seal described below, the flow is attached and will tend to remain attached with no appreciable induced turbulence. From this forward surface the bellmouth arcs inwardly and rearward to a cylindrical skirt 64 that has a terminal end 68 that is inboard of the terminal end 40 of the fixed shroud as shown in FIG. 2. The diameter of the rotatable shroud is correspondingly smaller than that of the fixed shroud 16 all along the axial length thereof to provide an annular clearance passage 70 therebetween through which discharge air normally has a tendency to recirculate. The radially extending fan blades 47 extend from a central drive hub 72 to connection with the cylindrical skirt 64 of the rotatable shroud so that this shroud rotates with the fan. With this construction air discharged by the fan when driven by the motor at certain operating speeds will have a significant radial component, here diagrammatically shown by arrow A, which partially blocks the clearance passage 70 at the discharge side of the fan. This embarrassment to recirculation air flow allows the fan to pump with higher efficiency since there is reduced pumping of recirculation air. Also the fan pumps with reduced noise since reduced amounts of recirculation air turning into the bellmouth and turbulence which may result therefrom is decreased as pointed out in greater detail in prior U.S. Pat. No. 4,329,946 cited above. Importantly in this invention the shroud construction is such that a forward air block is formed that further inhibits the flow of recirculation air for a wide range of fan operating points which materially extends the limited range of blockage provided by the extending ejector 38 and the rotatable shroud.

As best shown in FIG. 2 a vortex chamber 78 is formed between the bellmouth of the rotating shroud and the large diameter step 36 of the fixed shroud 16. This generally toroidal chamber is basically defined by the concavely curved outer wall 80 of the bellmouth 44 of the rotating shroud and the concavely curved inner wall 82 of the large diameter step of the outer shroud 16. This vortex chamber has a front restricted entrance 84 defined by the annular clearance between the outer peripheral edge 88 of the bellmouth 44 and the facing inner wall 89 of the fixed outer shroud 18. A restricted rear entrance 90 for chamber 78 is defined between the apex 92 of the annular constriction 94, triangular in cross section, formed on the interior of the large diameter step of the outer shroud. With this construction a convex 96 of air is generated from the action of recirculating air flow impinging on the rotating shroud side of the chamber 78 and by heat exchanger air flowing into the fixed shroud. The resulting vortex acts as a ring of high pressure that blocks the pathway of recirculating air flow so that the fan does not repump discharged air resulting in improved fan efficiency and flow distribution. Importantly in this invention this vortex block embarrasses the recirculation flow for substantially all fan operating points which extends well beyond the limited blockage provided by the immersion of the rotating shroud within the fixed shroud. In addition to blocking the recirculation air path the air vortex blocks the front annular entrance 84 so that quantities of air entering the fixed shroud through the radiator 10 routes into the bellmouth 44 instead of into the ejector as diagrammatically illustrated by flow arrow B.

While a preferred embodiment of the invention has been shown and described other embodiments will be now apparent to those skilled in the art. For example the vortex seal chamber can be made so that the inlet 90 can be defined by a rounded edge instead of the annular apex 92 with any such modification ensuring the formation of a vortex of flow to block recirculating flow for a wide range of fan speeds and operating points. Also the full rotating ring shroud can be replaced by segments of the ring shroud or winglets attached to each of the blades so that all of the seal geometry is present. Vortex formation, stability and magnitude of vortex pressure may be enhanced through use of small scale aerodynamic devices in the vortex chamber. These devices can be in the form of circular scoring in the surfaces of the vortex chamber similar to rifling of gun barrels, or could take form as small bladelets formed on the walls thereof.

The embodiments of the invention in which an exclusive property or privilege is claimed are defined as follows:

1. Shrouding for an engine cooling fan for operative mounting adjacent to a radiator through which engine coolant is circulated, comprising a stationary shroud secured with respect to said radiator, said stationary shroud having a forward face and large diameter generally cylindrical portion extending rearwardly from said forward face and having a reduced diameter generally cylindrical ejector portion extending rearwardly from said large diameter portion to define a stepped diameter opening through said fixed shroud, a rotatable fan having a centrally located hub and a plurality of fan blades extending radially from said hub to terminal tip portions, support means operatively mounting said fan for operation within said cylindrical opening, a rotatable shroud for said fan, said rotatable shroud comprising a bellmouth inlet section disposed within the large diameter portion of the fixed shroud and a small diameter skirt portion extending rearwardly from said bellmouth fixed to the tips of said blads, the improvement comprising an annular vortex chamber defined by cooperating convexly curved walls of said bellmouth and said large diameter portion of said fixed shroud, said fixed and rotating shrouds defining restricted forward and rear openings leading into of said chamber whereby a vortex of air is formed therein in response to the rotational drive of said fan and the pumping of air therethrough to provide a high pressure zone to block the flow of recirculating air from said the discharge of said fan to said bellmouth to thereby increase fan pumping efficiency and reduce fan generated noise.

2. The shrouding of claim 1 above wherein said rotatable shroud is immersed within said fixed shroud so that a second air seal is formed between said skirt of said rotatable shroud and said ejector portion of said fixed shroud.

3. Shrouding for an engine cooling fan for operative mounting adjacent to a radiator through which engine coolant is circulated, comprising a stationary shroud secured with respect to said radiator, said stationary shroud having a forward face and large diameter cylindrical portion extending rearwardly from said forward face and having a reduced diameter cylindrical ejector portion extending rearwardly from said large diameter portion to define a step diameter generally cylindrical opening through said stationary shroud, a rotatable fan having a centrally located hub and a plurality of fan blades extending radially from said hub and terminating in tip portions, support means operatively mounting said fan for operation within said cylindrical opening, a rotatable fan shroud, said rotatable shroud comprising a bellmouth inlet section disposed within the large diameter cylindrical portion of the fixed shroud and a small diameter skirt portion fixed to the tips of said blades disposed within the reduced diameter cylindrical portion of said stationary shroud, the improvement comprising a discrete annular chamber defined by cooperating walls of said bellmouth and, said large diameter portion of said fixed shroud whereby a vortex of air is formed therein in response of the rotational drive of said fan and the pumping of air therethrough to provide a high pressure zone to block the flow of recirculating air from the discharge of said fan to said bellmouth to thereby increase fan pumping efficiency and reduce fan generated noise.

4. In combination, an air cooled radiator through which engine coolant is circulated, a rotatable fan spaced rearwardly of said radiator, said fan having a hub and a plurality of arcuately spaced fan blades extending radially therefrom for pumping air through said radiator for dissipating heat energy from the coolant flowing therethrough, motor means operatively connected to said hub for rotatably driving said fan, a rotatable shroud secured to the outer tips of said fan blades including a cylindrical skirt section disposed around said fan blades and an annular bellmouth section flared radially outward from the forward end of said skirt section forming an air inlet for said fan, a fised shroud circumferentially surrouding said rotatable shroud, said rotatable shroud being immersed within the confines of said fixed shroud and defining a discrete and generally torodial chamber between the outer surface of said bellmouth and the inner surface of said fixed shroud, first and second restricted entrances for air flow in said chamber which triggers the generation of a vortex of air therein in response to operation of said rotatable fan to pneumatically block said recirculation flow path between said shrouds to minimize the repumping of discharge by said fan thereby increasing fan efficiency and effectiveness.

5. In combination, an air cooled radiator through which engine coolant is circulated, a rotatable fan spaced rearwardly of said radiator, said fan having a hub and a plurality of arcuately spaced fan blades extending radially therefrom for pumping air through said radiator for dissipating heat energy of the coolant flowing therethrough, motor means operatively connected to said hub for rotatably driving said fan, a rotatable shroud secured to the outer tips of said fan blades including a cylindrical skirt section disposed around said fan blades and an annular bellmouth section flared radially outward from the forward end of said skirt section forming an air inlet for said fan, a fixed shroud circumferentially surrounding said rotatable shroud, said rotatable shroud being immersed within the confines of said fixed shroud and defining a discrete and generally torodial chamber between the outer surface of said bellmouth and the inner surface of said fixed shroud, a first annular entrance between the periphery of said bellmouth and an adjacent inner wall of said fixed shroud and a second restricted annular entrance defined by an axially extending recirculation flow path between said skirt portion and said fixed shroud communication with said chamber in which a vortex of air is generated during air pumping of said rotatable fan to pneumatically block said recirculation flow path between said shrouds thereby increasing fan efficiency and effectiveness.

* * * * *